United States Patent [19]

Chitayat

[11] Patent Number: 4,595,870
[45] Date of Patent: Jun. 17, 1986

[54] LINEAR MOTOR

[75] Inventor: Anwar Chitayat, Northport, N.Y.

[73] Assignee: Anorad Corporation

[21] Appl. No.: 638,489

[22] Filed: Aug. 7, 1984

[51] Int. Cl.$^4$ ............................................. G05B 11/00
[52] U.S. Cl. ..................................... 318/687; 318/135
[58] Field of Search ................... 318/135, 687; 310/12

[56] References Cited

U.S. PATENT DOCUMENTS

| | | | |
|---|---|---|---|
| 3,268,747 | 8/1966 | Snowdon | 318/135 X |
| 3,594,622 | 7/1971 | Inagaki | 318/135 |
| 3,706,922 | 12/1972 | Inagaki | 318/135 |
| 4,318,038 | 3/1982 | Munehiro | 318/135 |
| 4,340,846 | 7/1982 | Putt | 318/135 |
| 4,368,413 | 1/1983 | Tazaki | 318/135 |
| 4,404,671 | 9/1983 | Kuribayashi et al. | 318/687 X |
| 4,463,300 | 7/1984 | Mayne | 318/687 |

*Primary Examiner*—B. Dobeck
*Attorney, Agent, or Firm*—Thomas R. Morrison

[57] ABSTRACT

A linear motor separates the functions of commutating into a first function for enabling a subset of coils in a linear stator which are within the magnetic influence of permanent magnets in the movable element and a second function for applying the drive power to the enabled subset. One pair of sensors produces sine and cosine signals to maintain a contred coils, the fiabout the phase of power which should be applied to the enabled subset. Another sensor produces a proportional signal which varies linearly between zero and one over each electrical quadrant with a short non-changing interval at maximum and minimum. The control system employs the sine, cosine and proportional signals to synthesize a pair of quasi-sinusoidal waveforms for application to alternate coils in the enabled subset of coils. The short non-changing intervals in the proportional signal are employed to ensure that polarity changeover to the enabled coils takes place at zero volts for bumpless drive. A balanced version of the linear motor is disclosed for reducing the load on the structure supporting the movable element.

16 Claims, 12 Drawing Figures

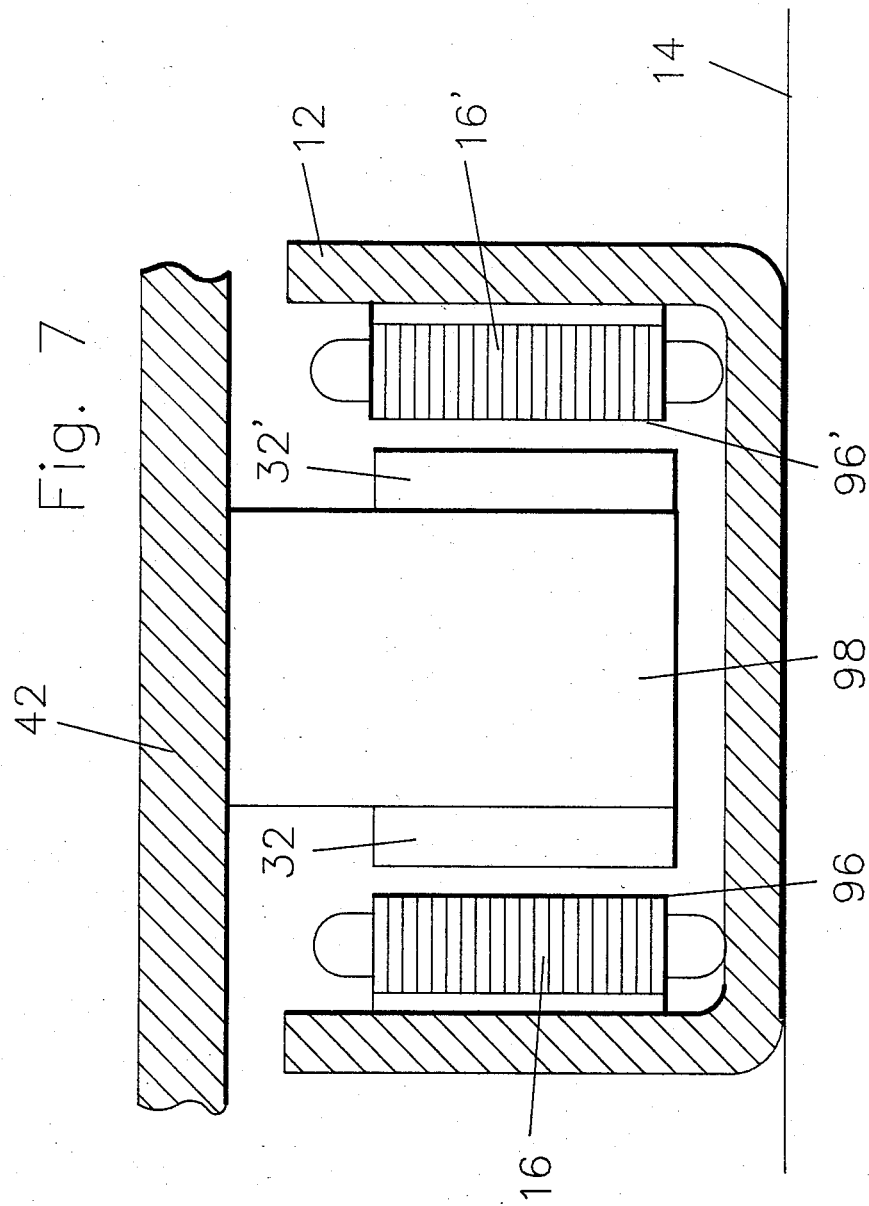

LINEAR MOTOR

BACKGROUND OF THE INVENTION

The present invention relates to linear motors and, more particularly, to apparatus for sensing and controlling the position of a movable element of a linear motor.

Electric motors conventionally include a stationary portion, or stator, and a movable portion. In electric motors adapted for turning an output shaft, the movable portion, called the rotor, is concentrically arranged with the stator. Although the most common rotary motor employs a cylindrical rotor rotating within an annular stator, the reverse arrangement is not unknown.

An electric motor of the linear type has more recently found use in certain applications. A linear motor employs a stator which can be thought of as being similar to the stator of a rotary motor which has been developed, or opened out, into a flattened assembly. Similarly, the rotor of the rotary motor is replaced by a linear counterpart which moves in a line with respect to the stator.

Alternating current versions of linear motors of the synchronous type are disclosed in U.S. Pats. Nos. 3,594,622; 3,699,365 and 3,706,922, among many others. Linear motors of the induction type are disclosed in U.S. Pats. Nos. 3,770,995; 3,824,414 and 3,884,154, among many others.

An even more recent type of linear motor employs direct current using either wound field-generating coils on both the moving and stationary elements or using one wound element and one element which employs one or more permanent magnets. Such a linear motor is disclosed in U.S. patent application Ser. No. 383,351, now Pat. No. 4,560,911 invented by the present applicant. In the referenced patent application, a stator employs a U-shaped channel to contain the stator field-generating elements. A movable element is guided to move along the axis of the U-shaped channel. An apparatus to be linearly displaced is connected to the moving element.

In some cases, the stator of a linear motor can be very much longer than its moving element. For example, a linear motor stator measuring several feet long may be employed with a movable element only a few inches long. When the stator contains wound coils, it is only those coils in the vincinity of the moving element which are effective to interact with the magnetic field of the moving element to produce a motive force. All of the coils which are a substantial distance away from the moving element make no contribution to the work of the motor. Thus, in order to obtain improved motor efficiency, a linear slip ring technique is disclosed in the referenced patent application to apply power only to those stator coils facing, or immediately adjacent to, the movable element. Part of the linear slip rings perform the functions of a conventional commutator.

In their commutator functions, the slip rings perform the following:

1. they select, and apply power to, those stator coils in the vicinity of the moving element and
2. they reverse the polarity of the power applied to the coils at the proper points in the travel of the moving element as a function of the relationship between the positions of the magnetic poles on the stator and the moving element.

The latter function produces essentially instantaneous voltage reversal of the power fed to the energized coils. In some circumstances, this can result in force pulsations applied to the movable element.

Modern high-power linear motors of the type disclosed in the referenced patent application employ rare-earth permanent magnets having a very high field strength exerted over a very small gap. In some cases, the attractive force between the permanent magnets and the magnetic material in the stator can reach a value of several hundred pounds. This can increase the support structure required to maintain the movable element in position and to permit it to move along its axis.

OBJECTS AND SUMMARY OF THE INVENTION

It is an object of the invention to provide apparatus for providing improved commutation in a DC linear motor.

It is a further object of the invention to provide a linear motor in which the enablement of a subset of stator coils is separated from the application of power to the enabled coils.

It is a still further object of the invention to provide a linear motor having sensing means for detecting phase positions of a movable element and a linear sensing means for producing an output signal linearly related to a position of the movable element within a phase of poles of a linear stator thereof. A control system is effective to employ the phase signals and the linear signal for synthesizing a driving waveform for a subset of the coils of the linear stator.

It is a still further object of the invention to provide a balanced linear motor in which opposed static magnetic forces on the movable element substantially counterbalance each other whereby a reduced static load is imposed on the support apparatus for the movable element.

Briefly stated, the present invention provides a linear motor having apparatus for separating the functions of commutating into a first function for enabling a subset of coils in a linear stator which are within the magnetic influence of permanent magnets in the movable element and a second function for applying the drive power to the enabled subset. One pair of sensors produces sine and cosine signals to maintain a control system updated about the phase of power which should be applied to the enabled subset. Another sensor produces a proportional signal which varies linearly from zero to one over each electrical quadrant with a short non-changing interval at maximum and minimum. The control system employs the sine, cosine and proportional signals to synthesize a pair of quasi-sinusoidal waveforms for application to alternate coils in the enabled subset of coils. The short non-changing intervals in the proportional signal are employed to ensure that polarity changeover to the enabled coils takes place at zero volts for bumpless drive. A balanced version of the linear motor is disclosed for reducing the load on the structure supporting the movable element.

According to an embodiment of the invention, there is provided a linear motor system comprising a linear motor, the linear motor including a stator and a movable element, the stator including a plurality of coils wound thereon effective for producing a plurality of magnetic poles having alternating magnetic polarities, the movable element including at least one permanent magnet having at least one permanent magnetic pole facing the stator, means for sensing first and second phase positions of the at least one permanent magnetic pole with respect to the plurality of magnetic poles, means for enabling a subset of the plurality of coils within a substantial magnetic influence of the at least one permanent magnetic pole and means in the control system responsive at least to the phase positions for producing a first driving signal for application to alternate ones of the enabled coils and a second driving signal for application to a remainder of the enabled coils, the first and second driving signals having polarities and amplitudes effective for applying a desired force to the movable element.

According to a feature of the invention, there is provided a motor comprising a linear stator, a movable element, a plurality of coils in the linear stator, means for selectively enabling application of first and second driving signals to alternate ones of a subset of the coils in the linear stator, the subset being effective to produce a plurality of magnetic poles, a plurality of permanent magnets affixed to the movable element, the plurality of permanent magnets being effective to magnetically interact with the plurality of magnetic poles, a first optical commutation sensor, a first light source, means for affixing the first optical commutation sensor to one of the linear stator and the movable element, a mask, means for affixing the mask to the other of the linear stator and the movable element, the mask containing first means for masking a line of sight between the first optical commutation sensor and the first light source at first portions of travel of the movable element and for permitting the first light source to illuminate the first optical sensor at second portions of travel of the movable element, a second optical commutation sensor, a second light source, the mask containing means for masking a second line of sight between the second optical commutation sensor and the second light source at third portions of travel of the movable element and for permitting the second light source to illuminate the second optical sensor at fourth portions of travel of the movable element, the first, second, third and fourth portions of travel including a predetermined phase relationship with the plurality of magnetic poles, a large-area sensor, a third light source, means for affixing the large-area sensor to one of the linear stator and the movable element, the mask containing third means for linearly changing a masking of a third line of sight between the large-area sensor and the third light source over a substantial portion of the travel of the movable element, the large-area sensor being effective for producing an output signal responsive to a portion of an area thereof illuminated by the third light source, and a control system including means responsive to the predetermined phase relationship and to the output signal for producing at least first and second drive signals for connection to the plurality of coils whereby a controlled driving of the movable element is achieved.

According to a further feature of the invention, there is provided a linear motor comprising first and second parallel spaced-apart linear stators, each of the first and second linear stators including a plurality of coils therein, the coils being effective for producing a plurality of magnetic poles facing the other of the linear stators, a movable element disposed between the first and second linear stators, a first plurality of permanent magnets on a first side of the movable element facing the first linear stator, a second plurality of permanent magnets on a second side of the movable element facing the second linear stator, means for movably supporting the movable element for movement parallel to the first and second linear stators, a magnetic attraction between the first plurality of permanent magnets and the first linear stator being substantially balanced by a substantially equal and oppositely directed magnetic attraction between the second plurality of permanent magnets and the second linear stator whereby a static load on the means for movably supporting is reduced, means for sensing a position of the movable element with respect to the first and second linear stators, means for enabling application of power to first and second subsets of the coils in the first and second linear stators respectively which are within a magnetic influence of the first and second plurality of permanent magnets and for inhibiting application of power to others of the coils and means for applying at least first and second drive signals to the first and second subsets of the coils.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 7 is a balanced version of the linear motor of FIG. 3.

DETAILED DESCRIPTION OF THE PREFERRED EMBODIMENT

Figure 1:
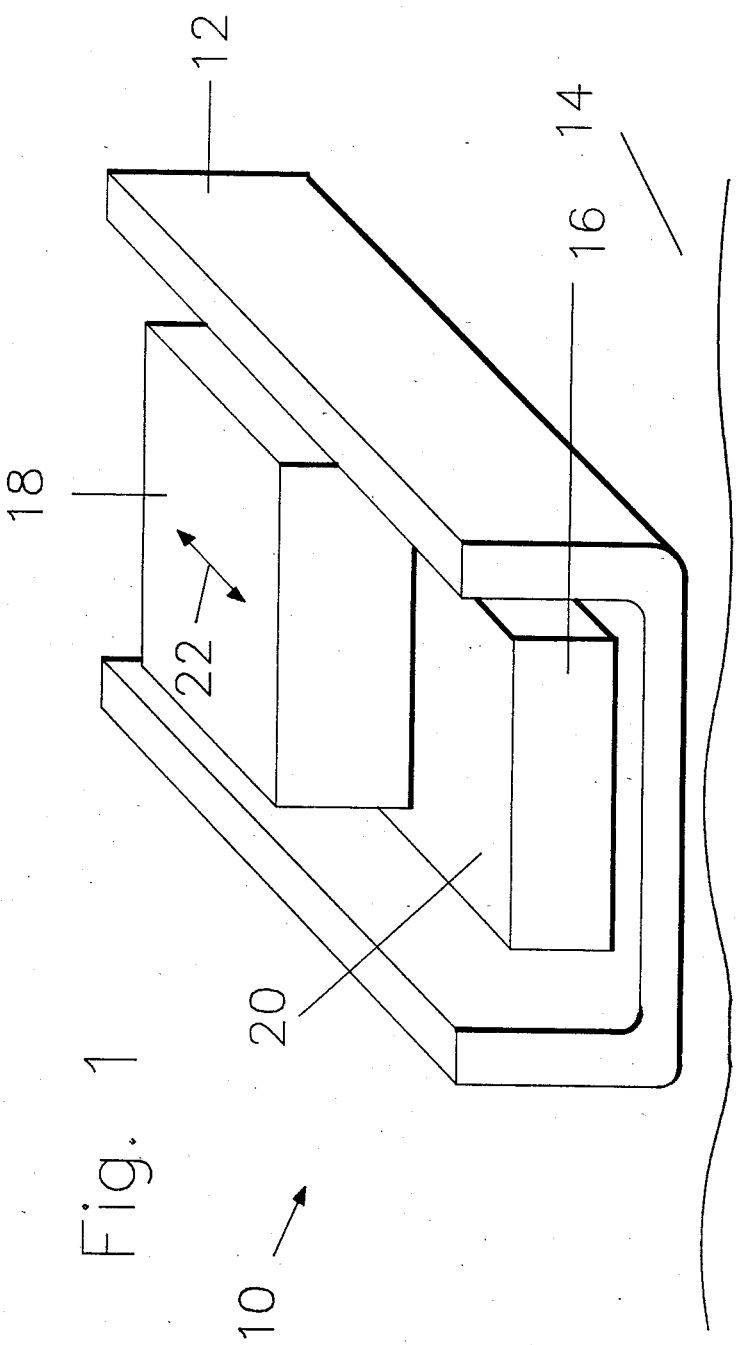
FIG. 1 is a perspective view of a linear motor according to the prior art.

Referring now to FIG. 1, there is shown, generally at 10, a linear motor according to the prior art as disclosed, for example, in the referenced patent application. A U-shaped channel 12, which is mountable on any convenient mounting surface 14, encloses a wound stator 16. A movable element 18 is supported by any convenient means for movement parallel to an upper surface 20 of wound stator 16 along an axis indicated by a double-headed arrow 22. The support for movable element 18 may be, for example, a conventional positioning table (not shown in FIG. 1) to which it is affixed as shown, for example, in the referenced patent application. Upper surface 20 includes a plurality of windings (not shown) in slots thereof which receive power from a power source or control system (not shown) for producing a magnetic field to which movable element 18 is exposed. Movable element 18 includes a plurality of permanent magnets facing upper surface 20 of wound stator 16 for producing a magnetic field for interaction with the magnetic field produced by wound stator whereby movable element 18 is urged to move along the axis indicated by double-headed arrow 22.

The referenced embodiment employs a DC power source suitably controlled and commutated by stationary linear slip rings and a stationary commutator, both of which are contracted by brushes affixed to move with movable element 18. Only the coils in wound stator 16 which are within the magnetic influence of movable element 18 are energized through the commutator. In addition, the commutator tells the linear motor where the magnetic poles of the movable element are located with respect to the magnetic poles of the stator. When the two sets of magnetic poles reach a predetermined relationship, the commutator and brushes reverse the polarity of the voltage fed to the coils in order to permit continued linear unidirectional motion. In essence, the commutator and brushes operate like sets of switches which perform both the selection function for selecting a subset of the coils lying in the vicinity of the movable element and also control the polarity of the voltage fed to the coils.

The selection of active coils and the polarity-switching functions that have conventionally been performed by commutators may preferably be performed by separate devices or techniques according to an embodiment of the invention. That is, one technique may be employed to select the coils within the influence of the movable element and a separate technique may be employed to sense the position of movable element 18 in order to control the application and/or switching of power to the selected coils. Such a system is illustrated in the simplified block diagram of FIG. 2. As illustrated, wound stator 16, which may be of indefinite length, consists of a plurality of coils 24, of which only coils 24', 24'', 24''' etc. are shown disposed parallel to an axis of motion of movable element 18 indicated by double-headed arrow 22. Each coil 24 is either enabled or inhibited by a corresponding switch 26', 26'', 26''' etc. individually controlling whether or not power supplied by a control system 28 is fed thereto. Thus, control system 28, in conjunction with coils 24', 24'', 24''' etc. determines which of movable elements 18 receive power. An information channel 30 conveys information to control system 28 regarding the positional relationships of permanent magnets 32 on movable element 18 and coils 24 on wound stator 16. A control channel 34 closes those of switches 26', 26'', 26''' etc. controlling power to those coils 24', 24'', 24''' etc. which are within the influence of permanent magnets 32 on movable element 18 and leaves the remainder of such coils 24 deenergized.

Control system 28 also provides two power feed lines 36 and 38 connected respectively to alternate ones of coils 24. Control system 28 applies a voltage of one polarity on one of power feed lines 36 and 38 and a voltage of the opposite polarity to the other of power feed lines 36 and 38. As movable element 18 reaches a predetermined switching point, control system 28 reverses the polarity of the voltage fed to power feed lines 36 and 38 as necessary to provide continued unidirectional motion. The connections of coils 24 to power feed lines 36 and 38 are alternated as shown to provide alternating north and south magnetic poles on adjacent ones of coils 24, as is conventional. Information channel 30 conveys the required positional information to permit control system 28 to select the appropriate point for producing the voltage reversal. Power feed lines 36 and 38 may continue as indicated by an arrow 39 to feed power to an indefinite number of additional coils 24 (not shown). The direction and magnitude of desired motion may be communicated to control system 28 by any convenient means such as, for example, by a command signal line 40 which may be generated by conventional manual or programmed computer controls (not shown).

Although information channel 30 is shown as a single dashed line, either the same, or completely separate, sensing and transmission devices may be employed to sense the position of movable element 18 and to control switches 26 and the voltages fed to power feed lines 36 and 38. In one embodiment of the invention, use is made of the fact that a strong local magnetic field is produced by permanent magnets 32 in the vicinity of movable element 18. This magnetic field decays rapidly with distance away from movable element 18. Thus, a magnetic sensor may be employed in the vicinity of each coil 24 for sensing the presence of permanent magnets 32 nearby and for controlling the operation of associated switches 26. For example, a Hall-effect switch (not shown) may be associated with each coil 24, or with a small contiguous set of coils 24, for sensing the nearby presence of permanent magnets 32. The Hall-effect switches may, in fact, also perform the function of switches 26 or they may be used to control switching devices having a capability for handling greater power such as, for example, power transistors or one of several types of thyristors. Magnetic reed switches may alternatively be employed to sense the nearby presence of permanent magnets 32. In some applications, the magnetic fields generated by coils 24 may mask the magnetic fields in the vicinity of permanent magnets 32 and thereby prevent the use of magnetic sensing devices for this purpose. The masking effect may be reduced by positioning each magnetic sensing device in a suitable position midway between adjacent coils 24 where the magnetic fields thereof substantially cancel. Although a substantial error may occur using this approach, the precision required in selecting which coils 24 are enabled and which are inhibited is not very demanding. In a system with a large number of closely spaced coils 24, an extra one or two energized coils 24 beyond the maximum part of the influence of permanent magnets 32 may be tolerated without noticeable penalty.

While movable element 18 is moving along the axis of motion indicated by double-headed arrow 22, the magnetic fields of coils 24 are alternated by control system 28. The time at which the magnetic fields pass through zero in transition between polarities may be selected as the time at which sensing of the presence of permanent magnets 32 in the vicinity of the magnetic-sensing devices may be performed. Those switches 26, which are closed at this time, may be maintained in the closed condition until the next time that sensing is performed as the magnetic fields generated by coils 24 pass through zero during switching.

Instead of magnetic-sensing devices, an optically actuated switching device may be associated with each coil 24 and a light source may be associated with movable element 18 to illuminate or shadow those switching devices in the vicinity of movable element 18. Each of switches 26 may be, for example, a phototransistor, represented by the switch contacts shown, which is turned on by one or more light sources carried on movable element 18. Instead of mounting the light sources on movable element 18, and coping with the problem of feeding power to movable element 18, one, or a plurality of, light sources may be stationarily mounted on linear motor 10. Movable element 18 may be equipped with one or more mirrors suitably positioned and angled to reflect light from such stationary light sources into stationary optically actuated switches. In a corresponding manner, instead of directing light onto optically actuated sensors, each optically actuated sensor may normally receive light from a stationary source and movable element 18, or a suitable device movable with movable element 18, may be employed to block the light reaching suitable ones of the optically actuated sensors such that a pattern of actuated and non-actuated optically actuated sensors is created which corresponds generally to the region along the axis of motion indicated by double-headed arrow 22 in which a substantial magnetic field is produced by permanent magnets 32.

Figure 3:
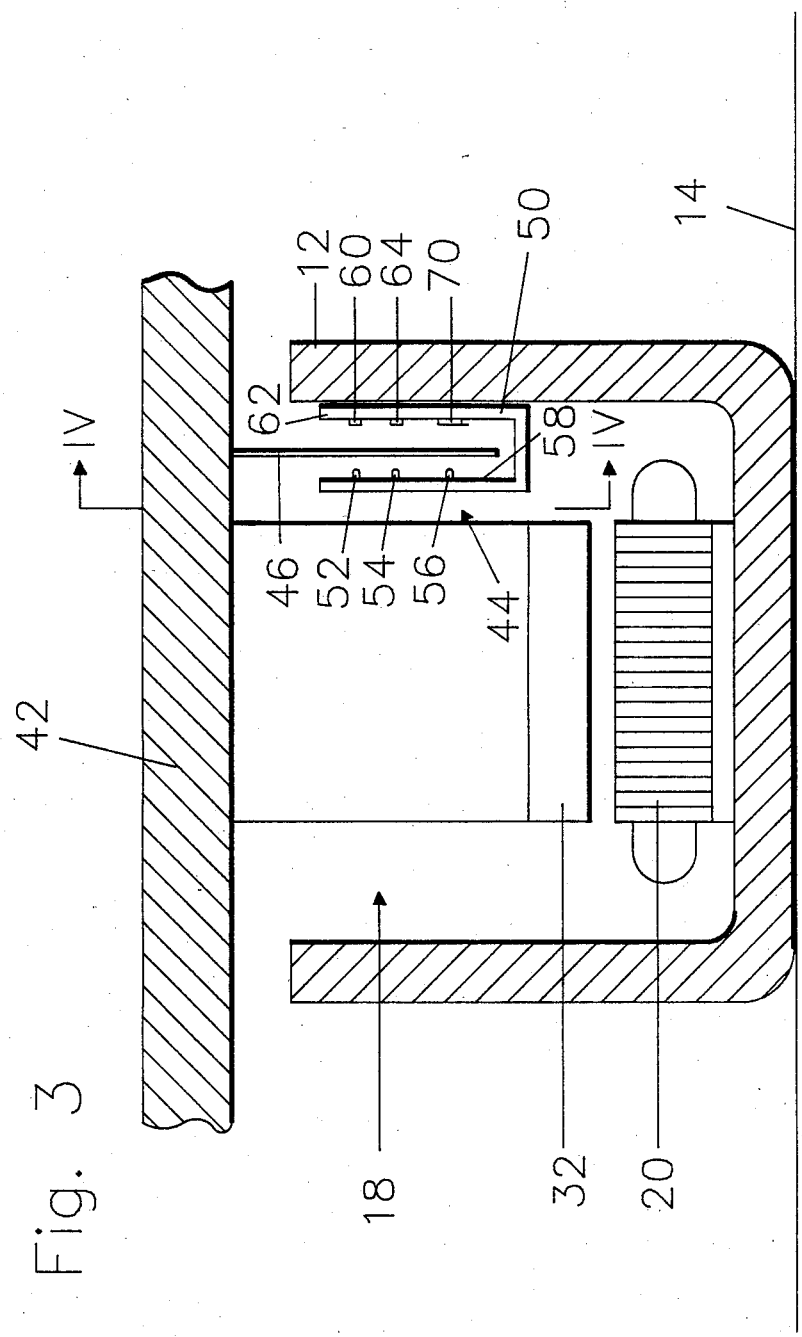
FIG. 3 is a transverse cross-section through a linear motor according to an embodiment of the present invention.
Figure 4:
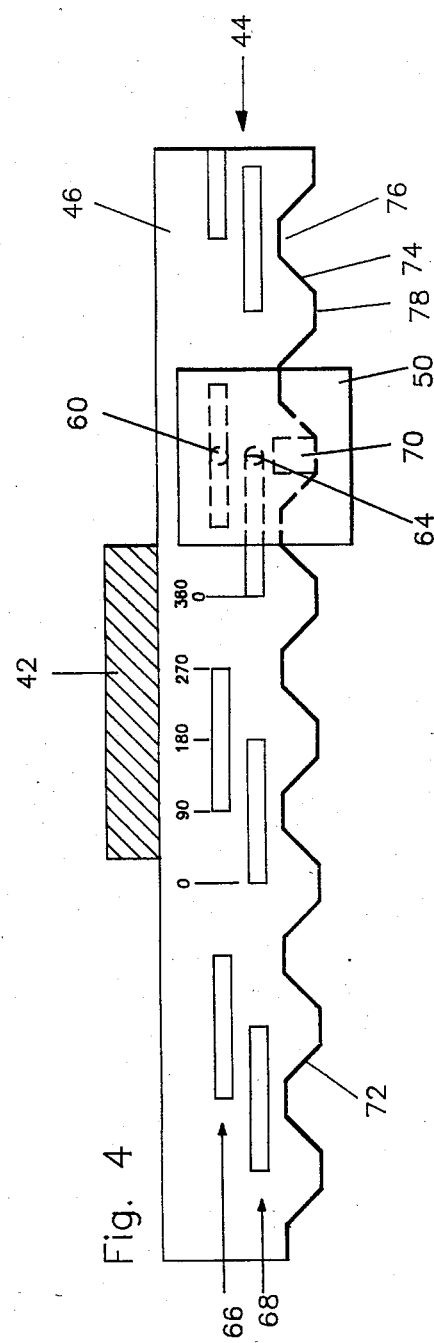
FIG. 4 is a cross-section taken along IV—IV in FIG. 3.

Referring now to FIGS. 3 and 4, one optical sensing technique is illustrated according to an embodiment of the invention. Movable element 18 is illustrated affixed to the underside of a table portion 42 of a positioning table (otherwise not shown) which is conventionally supported for maintaining the relationship shown between movable element 18 and upper surface 20 and for permitting linear motion of table portion 42 and movable element 18. An electro-optical sensing device 44 is provided for keeping control system 28 informed about the relative positions of magnetic poles on movable element 18 and upper surface 20.

A mask 46 is affixed for motion with table portion 42. A generally U-shaped saddle 50 is stationarily mounted on U-shaped channel 12 and partly encircles mask 46. First, second and third light sources 52, 54 and 56 are disposed on an inner surface 58 of one arm of saddle 50. A first commutation-sensing device 60 is mounted on an inner surface 62 of the second arm of saddle 50 facing light source 52. Similarly, a second commutation-sensing device 64 is mounted on inner surface 62 facing light source 54. As will be noted in FIG. 4, two sets of rectangular openings 66 and 68 are disposed in mask 46. Rectangular openings 66 are aligned so that they can pass between light source 52 and commutation-sensing device 60. Rectangular openings 68 are positioned so that they can pass between light source 54 and commutation-sensing device 64. When an opening is aligned with its respective light source and commutation-sensing device, light from the light source is sensed by the commutation-sensing device. At other times the light is blocked. Further description of the structure and function of light sources 52 and 54 and commutation-sensing devices 60 and 64 is given hereinafter.

A large-area sensor 70 is disposed on inner surface 62 facing light source 56. Large-area sensor 70 has a relatively large sensing area. A plurality of trapezoidal notches 72 are disposed along the lower edge of mask 46. Trapezoidal notches 72 include angled edges 74, top edges 76 and bottom edges 78. It will be noted in FIG. 4 that the lengths of top edges 76 and bottom edges 78 are slightly greater than the horizontal dimension of large-area sensor 70 and that the vertical separation of top edges 76 and bottom edges 78 is slightly greater than the vertical dimension of large-area sensor 70. Any portions of large-area sensor 70 which include a line of sight to light source 56 (FIG. 3) contribute to the signal output of large-area sensor 70. Large-area sensor 70 may be, for example, a silicon solar cell or other device capable of producing an electrical output which varies in proportion to the area thereof which is illuminated.

When table portion 42 is moved into the position shown in FIG. 4, a bottom edge 78 is aligned with large-area sensor 70. Thus, all light from light source 56 is cut off from large-area sensor 70. When table portion 42 and mask 46 are moved enough to align top edge 76 with large-area sensor 70, large-area sensor 70 receives maximum illumination from light source 56. Between these two extremes, the portion of the area of large-area sensor 70 exposed to illumination by light source 56 varies according to the shape of angled edge 74 which, in the preferred embodiment illustrated in FIG. 4, is a linear shape resulting in a linear change in the illuminated area of large-area sensor 70 and a resultant linear change in the signal produced by large-area sensor 70. Non-linear shapes of angled edges 74 may be employed for producing non-linear changes in the output signal from large-area sensor 70 by translation of mask 46 which may be suitable for matching a particular characteristic of large-area sensor 70 or control system 28 but which are not of special concern to the present disclosure. However, non-linear embodiments of angled edges 74 should be considered to be included within the present inventive concept.

It will be noted that rectangular openings 66 and 68 are offset from each other in the lengthwise direction and bear fixed relationships to top edges 76 and bottom edges 78. That is, each rectangular opening 66 begins and ends in the center of adjacent top edges 76. Similarly, each rectangular opening 68 begins and ends in the center of adjacent bottom edge 78. Commutation-sensing devices 60 and 64 are disposed in a vertical line above the center of large-area sensor 70. Commutation-sensing devices 60 and 64 are small-area devices which are either on or off depending on whether they are illuminated by their respective light sources 52 and 54, or are occluded by the unslotted portions of mask 46.

For purposes of further discussion to follow, a sequence of phase angles from 0 degrees to 360 degrees is shown above one pair of rectangular openings 66 and 68. Reading from left to right, 0 degrees occurs at the left end of rectangular opening 68. Ninety degrees is located at the left end of rectangular opening 66. Ninety degrees also corresponds to the center of rectangular opening 68. One-hundred and eighty degrees is located at the right end of rectangular opening 68 (the center of rectangular opening 66) and 270 degrees is located at the right end of rectangular opening 66. Neither rectangular opening 66 nor rectangular opening 68 are found in the region between 270 and 360 degrees.

Figure 5:
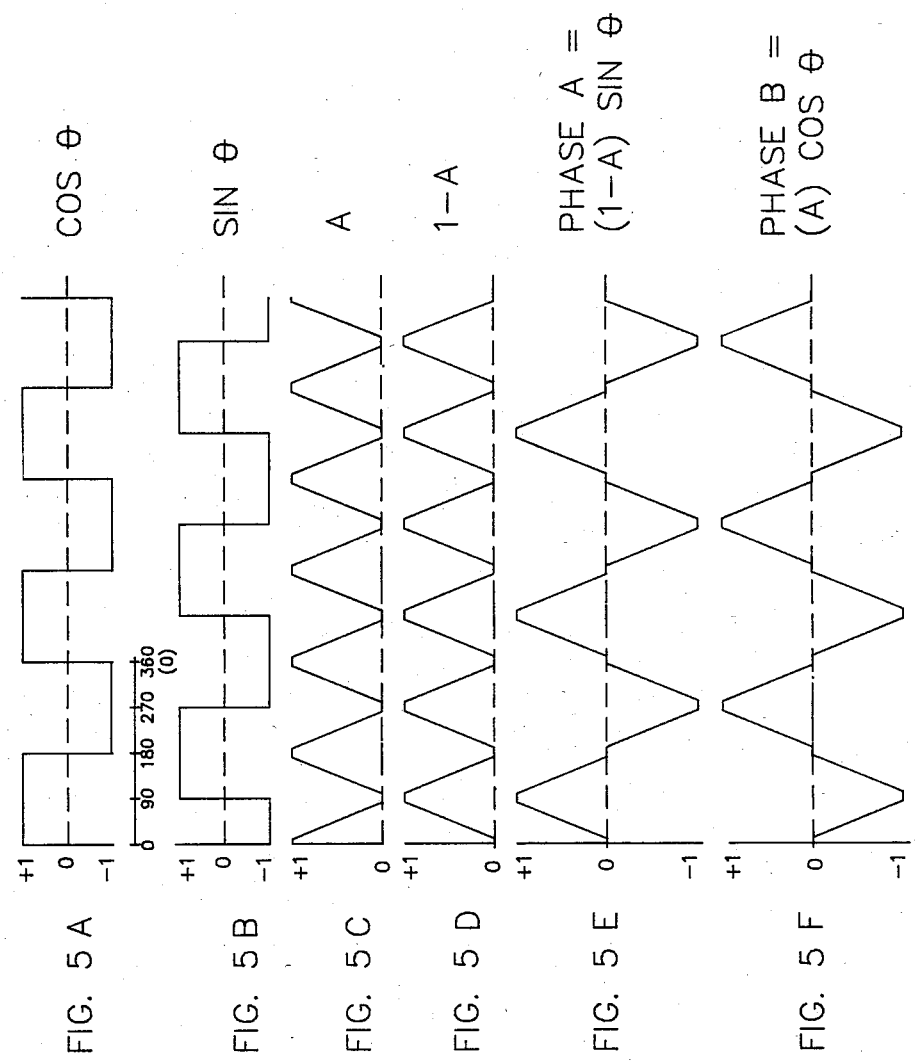
FIGS. 5A–5F are waveforms to which reference will be made in explaining the operation of one embodiment of the invention.

FIG. 5A shows the output waveform from rectangular opening 68 as a function of the phase angle of rectangular openings 66 and 68. Since commutation-sensing device 64 is essentially a point detector, its output rises abruptly from minimum to maximum as mask 46 passes zero degrees and remains at maximum until its output suddenly decreases to minimum at 180 degrees when the light impinging thereon is occluded by mask 46. Similarly, as shown in FIG. 5B, the output of commutation-sensing device 60 rises abruptly at 90 degrees, remains maximum until 270 degrees, and then falls abruptly to minimum. For purposes of description, it is herein assumed that the minimum signal is −1 and the maximum signal is +1. One skilled in the art would recognize that the actual values of these signals, as generated by commutation-sensing devices 60 and 64, are not important since conventional electronic devices may be used to shift and/or amplify the voltages produced as convenient for subsequent signal processing.

The output of large-area sensor 70, shown in FIG. 5C and identified as A, performs differently from that shown in FIGS. 5A and 5B. Since large-area sensor 70 is an area-type sensor, its output falls linearly from just past zero degrees to just before 90 degrees, remains constant at its minimum until just past 90 degrees, and then increases linearly until just before 180 degrees. This performance repeats itself from just after 180 degrees until just before 360 degrees (zero degrees of the next cycle). The short time during which the output of large-area sensor 70 remains constant at its maximum value is a result of the lengthwise dimension of top edge 76 being slightly greater than the lengthwise dimension of large-area sensor 70. Thus, large-area sensor 70 remains unchangingly fully illuminated during a small amount of travel of mask 46 between points just before and just after, 180 and 360 degrees. Similarly, the short time during which the output of large-area sensor 70 remains constant at its minimum value is a result of the lengthwise dimension of bottom edge 78 being slightly greater than the lengthwise dimension of large-area sensor 70. Thus, large-area sensor 70 remains fully occluded during a small amount of travel of mask 46 between points just before and just after, 90 and 270 degrees. These regularly occurring periods of constant output from large-area sensor 70 are located at points in the travel of table portion 42 coinciding with the points at which the polarity of power fed to enabled coils 24 is reversed. For convenience of description, it is assumed that the minimum value of the output of large-area sensor 70 is zero and the maximum is $+1$.

The waveforms in FIGS. 5A and 5B are phase-displaced by 90 degrees. The waveform in FIG. 5A is arbitrarily identified as a sine wave $\sin \theta$ (where $\theta$ is the phase angle) and the waveform in FIG. 5B is arbitrarily identified as a cosine wave $\cos \theta$. Strictly speaking, sine and cosine waveforms are smooth curves rather than square waves as shown, but the analogy to sine and cosine waveforms is useful in the remainder of the description to follow and such terminology is therefore adopted.

The three signals shown in FIGS. 5A, 5B and 5C are employed to construct driving waveforms for coils 24 which permit smoother operation of linear motor 10 and reduce the problems of switching polarity at high voltage and/or power.

Figure 2:
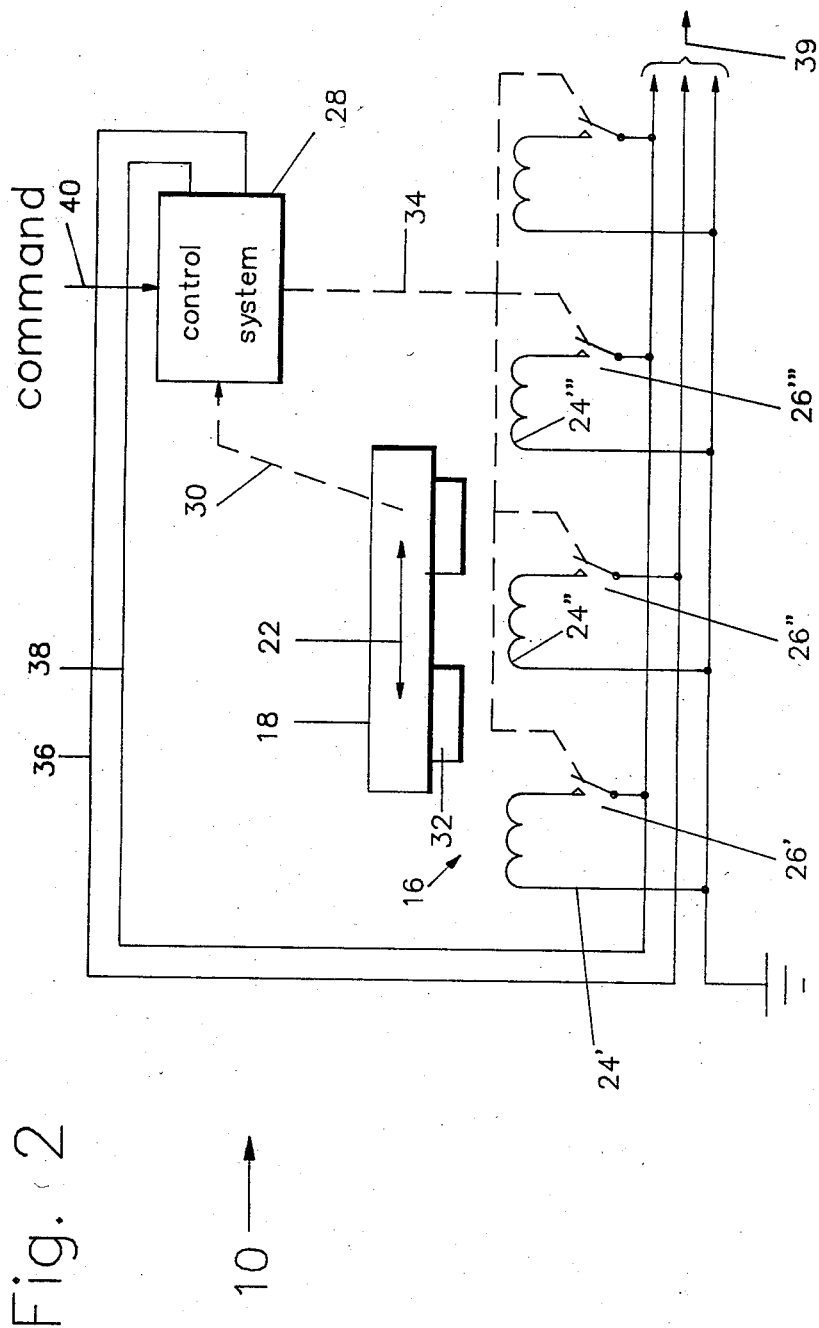
FIG. 2 is a simplified schematic diagram of a linear motor and control system to which reference will be made in explaining the operation of prior art devices and of the present invention.
Figure 6:
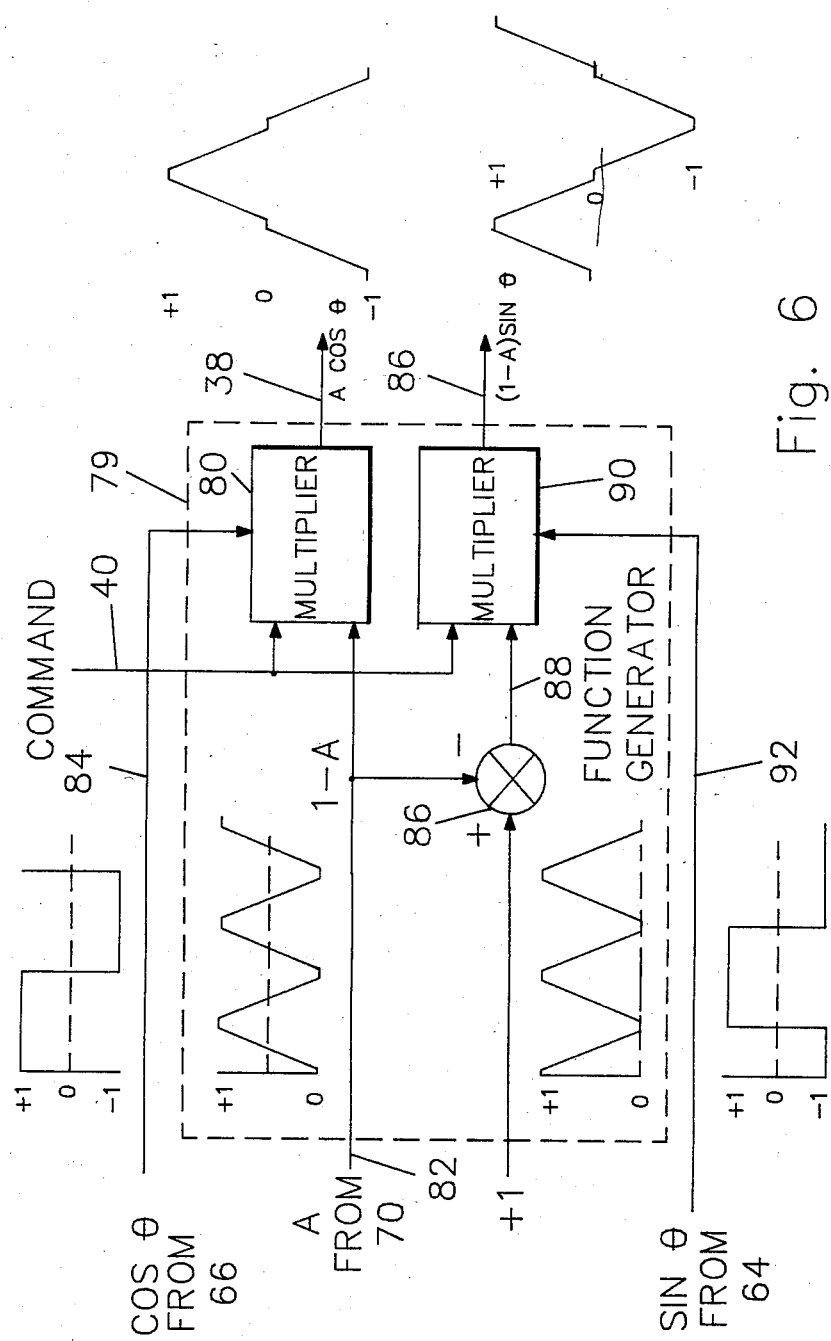
FIG. 6 is a simplified block diagram of a function generator for producing one type of drive signal according to an embodiment of the invention.

Referring now to FIG. 6, a function generator 79 of control system 28 is shown. A first multiplier 80 receives the signal A on a line 82 at one of its inputs and the signal $\cos \theta$ on a line 84 at the other of its inputs. It will be noted that each time the cosine signal switches between maximum and minimum, the signal A is zero. Multiplier 80 multiplies its two inputs to produce an output signal phase A (equal to A $\cos \theta$, see FIG. 5E) which is applied on power feed line 38 to enabled ones of switches 26 (FIG. 2). While the cosine signal is $+1$, the output of multiplier 80 is essentially equal to signal A. When the cosine signal is $-1$, however, the output of multiplier 80 is the inverse of signal A. Thus, the phase A signal fed to linear motor 10 approximates a sine wave having an amplitude of $+-1$. For short periods of time the phase A signal remains at zero and at its maximum and minimum values. The short periods at zero provide mechanical tolerances to ensure that polarity switching is completed during a time that no power is being delivered to linear motor 10. The short periods of constant signal at maximum and minimum have no significance to the phase A signal but are employed in providing zero switching of a phase B signal, which is equal to $(1-A) \sin \theta$ (see FIG. 5F).

The signal A is also applied to a minus input of an adder 86. A signal equal to $+1$ is applied to a plus input of adder 86. Adder 86 subtracts the value of signal A from $+1$ to derive a signal equal to 1-A (see FIG. 5D) which is a phase-inverted replica of signal A having a minimum of zero and a maximum of $+1$. The signal 1-A is fed on a line 88 to an input of a multiplier 90. The sine signal from commutation-sensing device 64 is fed on a line 92 to a second input of multiplier 90. Multiplier 90 multiplies its two inputs in a manner analogous to the processing performed by multiplier 80, previously described, to produce the phase B signal shown in FIG. 5F. The phase A and phase B signals are seen to have substantially identical shapes but to be phase displaced by 90 degrees.

The command signal on command signal line 40 may be applied to multipliers 80 and 90 for controlling the force generated by linear motor 10 and for controlling the direction of motion of movable element 18. That is, multipliers 80 and 90 preferably include variable gain which can be controlled by the command signal. This permits varying the amplitudes of the phase A and phase B signals according to the desired force. In addition, multipliers 80 and 90 may include conventional circuits for inverting their output signals under control of the command signal on command signal line 40. This has the effect of reversing the direction of motion of movable element 18. The desired control signals on command signal line 40 are produced by conventional devices and it is believed that further discussion of equipment for generating such control signals would not contribute to the ability of one skilled in the art to make and use the invention. In addition, apparatus for controlling the gain and performing signal inversions in multipliers 80 and 90 are conventional and their construction and function are fully within the knowledge of one skilled in the art. Thus, a further description of the contents of multipliers 80 and 90 is considered redundant to the present disclosure.

Electro-optical sensing device 44 may be mounted external to U-shaped channel 12 without departing from the spirit of the invention.

In a further embodiment of the invention, mask 46 may be stationarily mounted with respect to linear motor 10, and electro-optical sensing device 44, with its contents, may be mounted for motion with movable element 18 and table portion 42. In this embodiment, power must be supplied to, and signals must be conveyed from, the light sources and sensing devices in electro-optical sensing device 44. Such power and signals may be carried on cables in service loops or on coiled cords. Alternatively, such power and signals may be transferred from the moving to the stationary elements using linear slip rings. At least the signal A may preferably be conveyed by wire because of the conventional uncertainty in the contact resistance of slip rings which could distort the magnitude or linearity of the signal reaching multiplier 80. The fact that all communication from electro-optical sensing device 44 to multiplier 80 may be at low power eases the problem of flexible cabling. The higher-power signals needed for energizing stationary coils 24 are produced in multiplier 80 based on the low-power signals it receives.

Versions of linear motor 10 designed to operate at high power levels are normally equipped with a large number of permanent magnets 32 each of which is capable of exerting a large attractive force on the magnetic material in wound stator 16. For example, a static attractive force of several hundred pounds may be exerted by a plurality of permanent magnets 32. Such a static attractive force imposes substantial requirements on the system supporting movable element 18 such as, for example, a positioning table, of which a table portion 42 is shown in FIGS. 3 and 4. Referring now to FIG. 7, a balanced linear motor 94 includes a pair of opposed wound stators 16 and 16' having facing surfaces 96 and 96' disposed parallel to each other on opposed sides of a movable element 98. Movable element 98 is affixed for support and guidance to a table portion 42 of a positioning table (not otherwise shown). A plurality of permanent magnets 32 are closely spaced in opposition to facing surface 96. A further plurality of permanent magnets 32' are closely spaced in opposition to facing surface 96'.

The attractive force on facing surfaces 96 is opposed by a substantially equal and oppositely directed attractive force on facing surfaces 96'. The load on the supporting system is therefore substantially reduced.

In addition to the reduced load on the support structure, the embodiment of the invention in FIG. 7 is essentially two identical linear motors placed back to back. The force which can be generated by balanced linear motor 94 for a given length of movable element 98 is approximately doubled.

In addition to the above, advantage may be taken of the fact that the magnetic poles of permanent magnets 32 and wound stator 16 may be displaced in the lengthwise direction from the magnetic poles of permanent magnets 32' and wound stators 16'. With appropriately phased driving signals fed to the coils in wound stators 16 and 16', the residual poling of balanced linear motor 94 may be substantially reduced.

Although the preceding description has been directed toward a system for providing two-phase drive signals, it would be clear to one skilled in the art that a simple modification of the apparatus would be effective to provide drive signals of three or more phases without departing from the spirit or scope of the invention. For example, referring to FIG. 4, instead of the two sets of rectangular openings 66 and 68 phase displaced 90 degrees apart, three or more additional sets of rectangular openings (not shown) may be provided in a mask with appropriate relative phasing to provide the desired relative phases of the drive signals. In such a system, the two sets of coils 24' and 24" would, of course, be replaced by a more than two sets of coils 24 according to the number of phases employed. For example, if a three-phase drive system is employed, three sets of coils 24 may be provided.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A linear motor system comprising:
a linear motor;
said linear motor including a stator and a movable element;
said stator including a plurality of coils wound thereon effective for producing a plurality of magnetic poles having alternating magnetic polarities;
said movable element including at least one permanent magnet having at least one permanent magnetic pole facing said stator;
means for sensing first and second phase positions of said at least one permanent magnetic pole with respect to said plurality of magnetic poles;
means for enabling a subset of said plurality of coils within a substantial magnetic influence of said at least one pemanent magnetic pole; and
means in said control system responsive at least to said phase positions for producing a first driving signal for application to alternate ones of said enabled coils and a second driving signal for application to a remainder of said enabled coils, said first and second driving signals having polarities and amplitudes effective for applying a desired force to said movable element.

2. A linear motor system according to claim 1 wherein said means for sensing further includes means for producing a substantially linear signal dependent upon a linear position of said at least one permanent magnetic pole with respect to said plurality of magnetic poles and said control system includes means responsive to said linear signal and said first and second phase signals for synthesizing a waveform for said first and second driving signals.

3. A linear motor system according to claim 2 wherein said means for producing a substantially linear signal includes an optical sensor and a light source affixed to one of said stator and said movable element and a mask affixed to the other of said stator and said movable element, said optical sensor being of a type effective for producing an output signal related to an area thereof exposed to said light source and said mask including means for varying a portion of said area exposed to said light source as a function of said linear position.

4. A linear motor system according to claim 3 wherein said means for varying a portion includes trapezoidal notches in an edge of said mask, said trapezoidal notches including top edges having a first linear dimension exceeding a second linear dimension of said optical sensor, bottom edges having a third linear dimension exceeding a linear dimension of said optical sensor and angled edges joining said top and bottom edges, a relationship between said first, second and third dimensions being effective for producing an output signal from said optical sensor having constant maximum and minimum portions.

5. A linear motor system according to claim 4 wherein said control system includes means for performing a reversal of polarity of said first and second driving signals only during said constant maximum and minimum portions.

6. A linear motor system according to claim 5 wherein said control system includes means for reversing a polarity of said first driving signal during said minimum portions.

7. A linear motor system according to claim 6 wherein said control system includes means for inverting said linear signal without reversing a polarity of said linear signal to produce an inverted linear signal, said control system including means for performing a reversal of said second driving signal during a minimum of said inverted linear signal.

8. A linear motor system according to claim 1 wherein said means for enabling a subset includes a plurality of magnetic sensing means disposed in a vicinity of said coils, said magnetic means being of a type effective for sensing a magnetic influence of said at least one permanent magnet and said means for enabling including switch means for applying said first and second driving signals only to coils related to said magnetic sensing means whereby said subset of enabled coils is disposed within a magnetic influence of said at least one permanent magnetic pole and other coils outside said magnetic influence remain inhibited.

9. A linear motor system according to claim 1 wherein said means for sensing a phase position includes first and second optical commutation sensing devices and first and second light sources respectively positioned to illuminate said first and second optical commutation sensing devices, a mask, said mask including a first set of openings therein disposed in a first line of sight between said first light source and said first optical commutation sensing device, said mask being effective for preventing light from said first light source from illuminating said first optical commutation sensing device except when one of said first set of openings is disposed in said first line of sight, said mask including a second set of openings therein disposed in a second line of sight between said second light source and said second optical commutation sensing device, said mask being effective for preventing light from said second light source from illuminating said second optical commutation sensing device except when one of said second set of openings is disposed in said second line of sight, said first and second sets of openings including a predetermined phase relationship therebetween whereby first and second signals produced by said first and second optical commutation devices also include said predetermined phase relationship.

10. A motor comprising:
a linear stator;
a movable element;
a plurality of coils in said linear stator;
means for selectively enabling application of first and second driving signals to alternate ones of a subset of said coils in said linear stator, said subset being effective to produce a plurality of magnetic poles;
a plurality of permanent magnets affixed to said movable element, said plurality of permanent magnets being effective to magnetically interact with said plurality of magnetic poles;
a first optical commutation sensor;
a first light source;
means for affixing said first optical commutation sensor to one of said linear stator and said movable element;
a mask;
means for affixing said mask to the other of said linear stator and said movable element;
said mask containing first means for masking a line of sight between said first optical commutation sensor and said first light source at first portions of travel of said movable element and for permitting said first light source to illuminate said first optical sensor at second portions of travel of said movable element;
a second optical commutation sensor;
a second light source;
said mask containing means for masking a second line of sight between said second optical commutation sensor and said second light source at third portions of travel of said movable element and for permitting said second light source to illuminate said second optical sensor at fourth portions of travel of said movable element;
said first, second, third and fourth portions of travel including a predetermined phase relationship with said plurality of magnetic poles;
a large-area sensor;
a third light source;
means for affixing said large-area sensor to one of said linear stator and said movable element;
said mask containing third means for linearly changing a masking of a third line of sight between said large-area sensor and said third light source over a substantial portion of a travel of said movable element, said large-area sensor being effective for producing an output signal responsive to a portion of an area thereof illuminated by said third light source;
a control system; and
said control system including means responsive to said predetermined phase relationship and to said output signal for producing at least first and second drive signals for connection to said plurality of coils whereby a controlled driving of said movable element is achieved.

11. A linear motor according to claim 10 wherein said predetermined phase relationship includes a sine and cosine phase relationship.

12. A linear motor according to claim 11 wherein said output signal includes two full cycles within one cycle of one of said sine and cosine phase relationships.

13. A linear motor according to claim 12 wherein said third means for linearly changing includes a plurality of trapezoidal notches in said mask whereby said output signal includes a trapezoidal wave shape.

14. A linear motor according to claim 13 wherein said trapezoidal notches include a plurality of top edges and a plurality of bottom edges, at least one of said top and bottom edges being substantially parallel to a direction of travel of said movable element and having a linear dimension along said direction of travel which exceeds a linear dimension along said direction of travel of said large-area sensor whereby said output signal remains at at least one of a maximum and a minimum for a substantial portion of a travel of said movable element.

15. A linear motor according to claim 14 wherein said control system includes means for changing a polarity of said first and second drive signals at a time when said output signal is at one of its maximum and minimum values.

16. A linear motor comprising:
first and second parallel spaced-apart linear stators;
each of said first and second linear stators including a plurality of coils therein, said coils being effective for producing a plurality of magnetic poles facing the other of said linear stators;
a movable element disposed between said first and second linear stators;
a first plurality of permanent magnets on a first side of said movable element facing said first linear stator;
a second plurality of permanent magnets on a second side of said movable element facing said second linear stator;
means for movably supporting said movable element for movement parallel to said first and second linear stators;
a magnetic attraction between said first plurality of permanent magnets and said first linear stator being substantially balanced by a substantially equal and oppositely directed magnetic attraction between said second plurality of permanent magnets and said second linear stator whereby a static load on said means for movably supporting is reduced;

means for sensing a position of said movable element with respect to said first and second linear stators;

means for enabling application of power to first and second subsets of said coils in said first and second linear stators respectively which are within a magnetic influence of said first and second plurality of permanent magnets and for inhibiting application of power to others of said coils; and means for applying at least first and second drive signals to said first and second subsets of said coils.

* * * * *